(12) United States Patent
Lundbäck

(10) Patent No.: US 6,231,261 B1
(45) Date of Patent: May 15, 2001

(54) CLAMP FOR CLAMPING HIGH-FREQUENCY CABLES

(75) Inventor: Hans Olof Lundbäck, Markaryd (SE)

(73) Assignee: Teracom Components AB, Horby (SE)

( * ) Notice: Subject to any disclaimer, the term of this patent is extended or adjusted under 35 U.S.C. 154(b) by 0 days.

(21) Appl. No.: 08/933,239

(22) Filed: Sep. 18, 1997

(30) Foreign Application Priority Data

Sep. 23, 1996 (SE) .................................................. 9603448

(51) Int. Cl.[7] .................................................. B25G 3/24
(52) U.S. Cl. ........................ 403/27; 403/399; 403/396
(58) Field of Search .......................... 403/27, 398, 399, 403/395, 396, 400, 256, 260, 247; 24/525, 569, 278; 59/78.1

(56) References Cited

U.S. PATENT DOCUMENTS

| | | | |
|---|---|---|---|
| 2,805,877 | * 7/1957 | Ashley | 403/395 |
| 2,893,671 | 7/1959 | Flora et al. | |
| 3,041,574 | * 6/1962 | Cornell, Jr. | 403/396 X |
| 4,572,552 | 2/1986 | Orevik et al. | |

FOREIGN PATENT DOCUMENTS

| | | | |
|---|---|---|---|
| 2053828 | 3/1972 | (DE) . | |
| 2053828 | 5/1972 | (DE) . | |
| 2341618 | 3/1975 | (DE) . | |
| 569111 | * 5/1943 | (GB) | 403/400 |
| 9204/44 | * 10/1944 | (GB) | 403/400 |
| 513118 | * 2/1955 | (IT) | 403/400 |
| 92561 | * 8/1958 | (NO) | 403/395 |
| 443434 | 3/1983 | (SE) . | |
| 8100745 | 3/1981 | (WO) . | |

* cited by examiner

Primary Examiner—Lynne A. Reichard
Assistant Examiner—John R. Cottingham
(74) Attorney, Agent, or Firm—Tarolli, Sundheim, Covell, Tummino & Szabo

(57) ABSTRACT

The present invention relates to a clamp (1) for clamping or bracing high-frequency cables (2 and/or 3). The clamp (1) comprises an indicating device (21) that determines whether a spring (12) on the clamp (1) has been brought to exert the desired pressure or tensional force during assembly and maintain said desired pressure or tensional force thereafter.

8 Claims, 3 Drawing Sheets

CLAMP FOR CLAMPING HIGH-FREQUENCY CABLES

The present invention relates to a clamp for clamping or bracing high-frequency cables, which clamp is adapted to be provided on a holding device and which clamp comprises a spring device for clamping at least one high-frequency cable to the holding device, whereby the spring device includes a pressure means and a spring means, whereby the pressure means is adapted to engage the high-frequency cable, whereby the spring means is provided to be stretched so that it in a stretched position brings the pressure means to clamp or brace the high-frequency cable to the holding device with a predetermined spring force, and whereby an indicating device is provided to permit indication of whether the spring means has been stretched to a stretched position at which said spring means clamps the high-frequency cable to the holding device with a predetermined spring force.

A clamp for clamping or bracing cables is known from the publication DE 2 053 828. However, this clamp has no indicating device which permits reading or determination of when the clamp is tightened so that it sits neither too loose nor too tight.

The publication SE 443 434 relates to a clamp for connecting a pipe to a nipple. This clamp has an indicating device which during the connection renders it possible to determine when the clamp has been sufficiently tightened in order not to sit too loose nor too tight. This indicating device however, loosens from the clamp when the connection is done, which inter alia has the drawback that it is not possible, after connection, to read whether the clamp has maintained its initially set pressure or tensional force or if it has changed, e.g. so that said pressure or tensional force has become unacceptably low or high. Furthermore, said clamp consists of many different members, which can be a substantial drawback.

The object of the present invention is to provide a clamp with an indicating device which during assembly permits reading or determination of whether the spring means has been brought to the desired pressure or tensional force and, after assembly, whether said desired pressure has been maintained or not.

By utilizing the pressure plate and spring means of the clamp as an indicating device, the momentaneous pressure or tensional force of the spring means may be indicated at any time, including after several years.

The invention will be further described below with reference to the accompanying drawings, in which FIG. 1 is a plan view illustrating a clamp according to the invention for clamping or bracing two high-frequency cables to a holding device;

Figure 1:
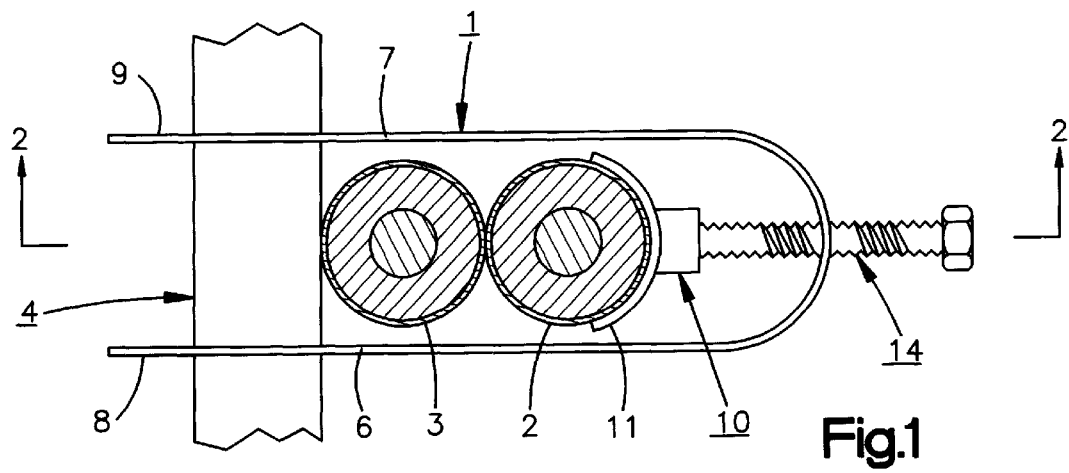
Figure 2:
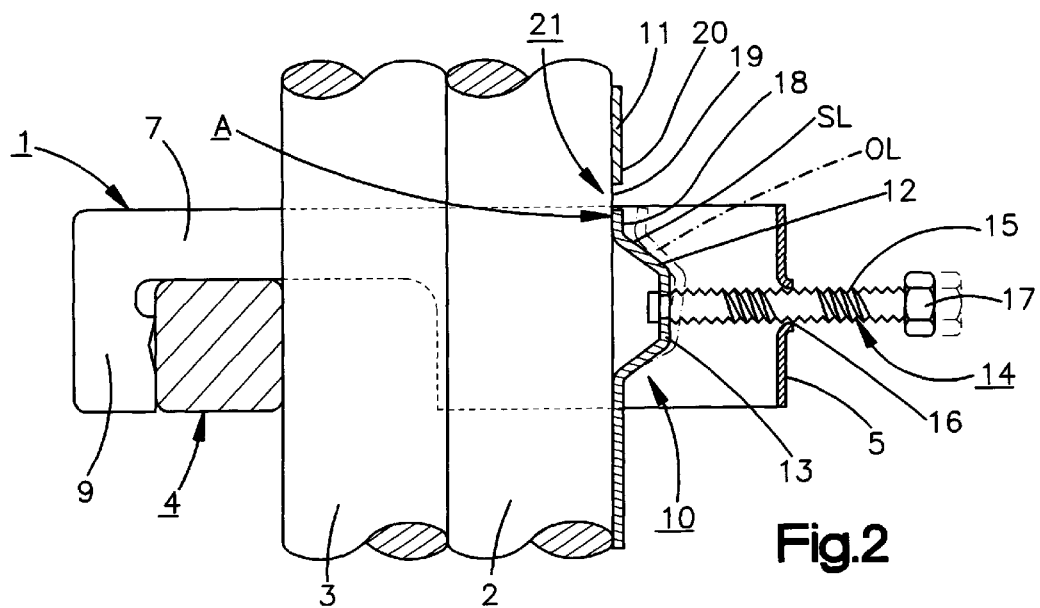
FIG. 2 is a section through the clamp along the line II—II in FIG. 1.

In the drawings, a U-shaped clamp 1 is illustrated for clamping or bracing two high-frequency cables 2, 3 to a holding device 4. In the embodiment shown, the clamp consists of a web 5 and two shanks 6, 7. Each shank 6 and 7 respectively, has an outer hook portion 8 and 9 respectively, which permits hooking of the clamp on to and behind the holding device 4, which in this case is shown as a part of a mast along which the high-frequency cables 2, 3 extend.

A spring device 10 is provided on the clamp 1 for clamping or bracing the high-frequency cables 2, 3 to the holding device 4 when the clamp 1 is hooked or hitched on to said holding device 4. The spring device 10 comprises a pressure means 11 which preferably is made of resilient material, e.g. spring steel, and which is adapted to engage the high-frequency cable 2. From this pressure means 11, a spring means has been punched, preferably in the shape of a tongue 12, which through an adhering end portion remains attached to the pressure means 11 and which includes a portion 13 bent out from said pressure means 11. A tightening or stretching means 14 is pivotally mounted on the bent portion 13, said tightening or stretching means 14 preferably including a threaded portion 15 which is threadably mounted in a hole 16 in the web portion 5 and which includes a screw head 17. By driving the tightening or stretching means 14 towards the high-frequency cables 2, 3, it is possible to tighten and thereby stretch or stress the tongue 12 so that said tongue exerts a pressure or tensional force on the pressure means 11 in a direction towards the holding device 4, whereby the high-frequency cables 2, 3 can be clamped to said retaining device.

The tongue 12 is provided to take an unstretched position OL relative to the pressure means 11 when said tongue 12 is not tightened by means of the tightening or stretching means 14. In this unstretched position OL, portions of the tongue 12 are situated at a distance from the pressure means 11, as is illustrated with dashed and dotted lines in FIG. 1.

Figure 5:
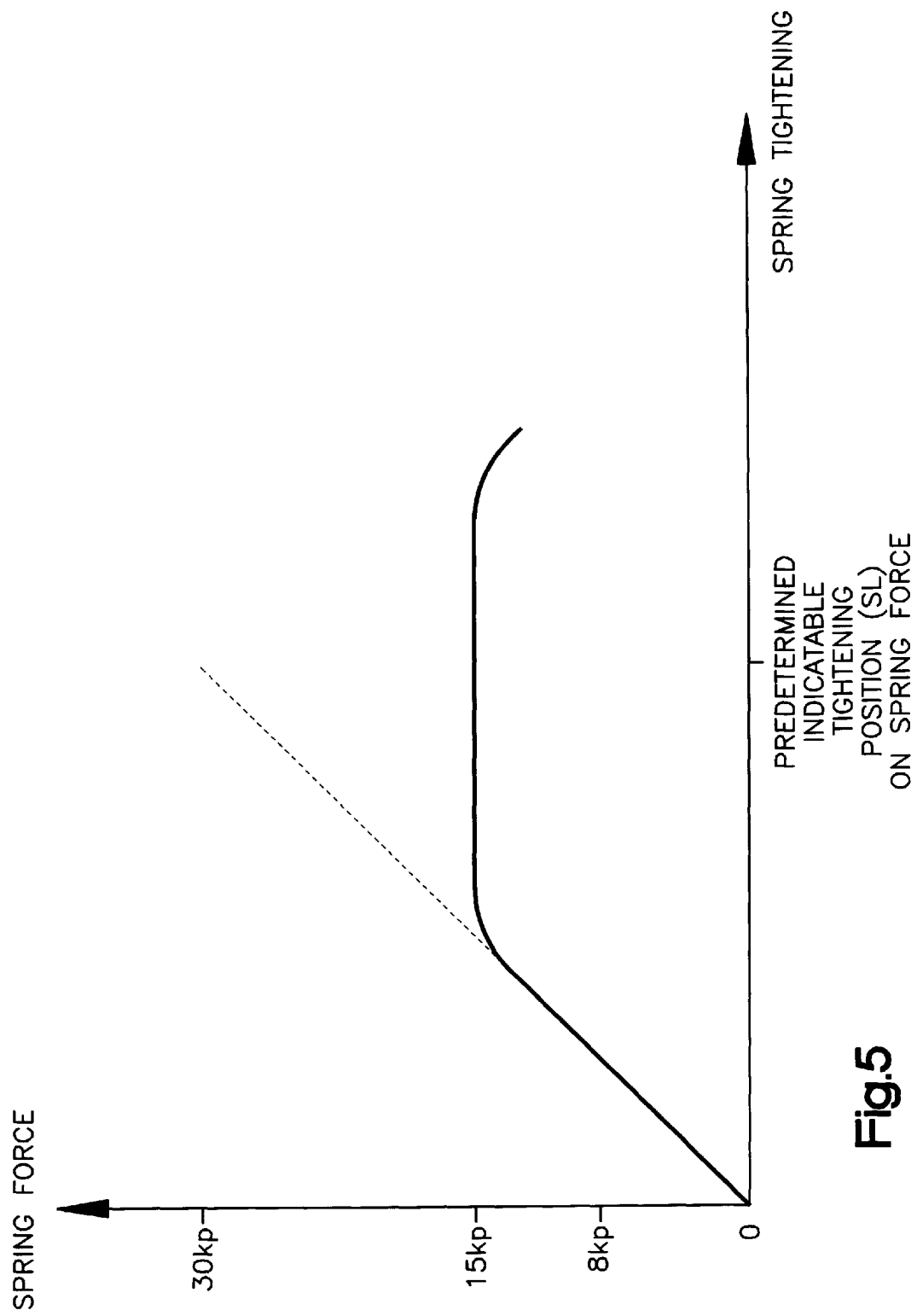
FIG. 5 is a graph showing the ratio spring stretching—spring force for a spring device forming part of the clamp.

By driving the tightening or stretching means 14 towards the high-frequency cables 2, 3, the tongue 12 is tightened in a direction towards the pressure means 11, which movement is represented by the Y-axis in the diagram in FIG. 5. As is apparent from this diagram, the spring force of the tongue is thereby increased from 0 to about 15 kp, which is reached when the tongue 12 has been tightened so far towards the pressure means 11 that said tongue 12 is located in a stretched position SL relative to said pressure means 11, as is illustrated with unbroken lines in FIG. 1. When the tongue 12 has reached the stretched position SL, a free end portion 18 of said tongue 12 is situated on one hand in an opening 19 defined in the pressure means 11 during punching of the tongue 12, on the other hand in contact with the high-frequency cable 2 and, thirdly, right opposite an edge portion 20 of the pressure means 11 located near the opening 19 therein.

Figure 3:
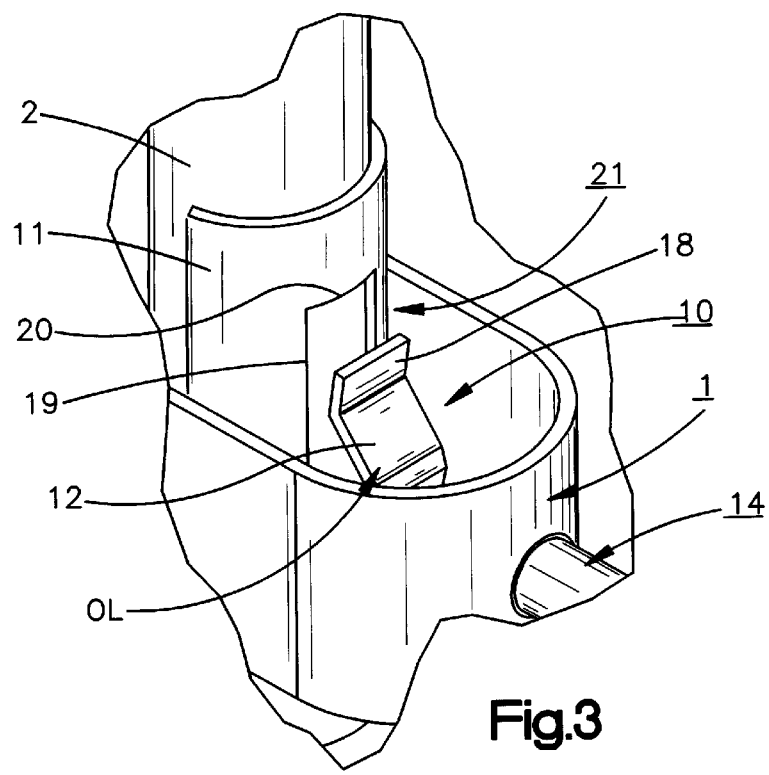
FIG. 3 illustrates a part of the clamp of FIG. 1 with a perspective view before said clamp is brought to clamp or brace the high-frequency cables.
Figure 4:
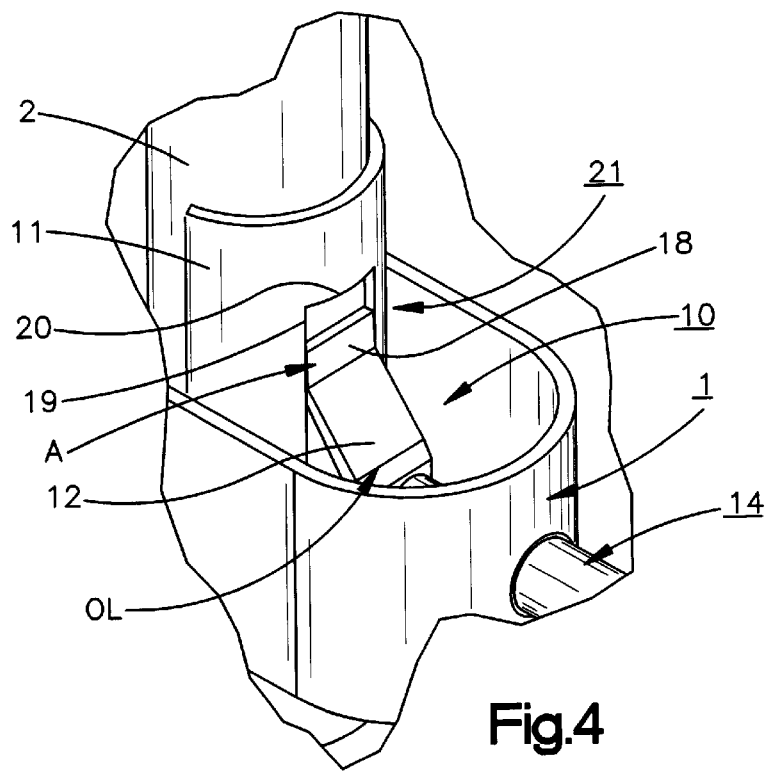
FIG. 4 is a perspective view of a part of the clamp of FIG. 1 after said clamp has been brought to clamp or brace the high-frequency cables.

An indicating device 21 is provided to permit indication of whether the spring device 10, i.e. the tongue 12 in the illustrated embodiment, is situated in the predetermined stretched position SL or not. This indicating device 21 includes a portion 18 of the spring means 12 and a portion 20 of the pressure means 11. Said portions 18, 20 are provided or arranged so that their positions relative to each other indicate the strain or stress of the spring means 12. The indicating device 21 is preferably made up of the free end portion 18 of the tongue 12 and the edge portion 20 of the pressure means 11. As is apparent from FIGS. 3 and 4, it is possible from the mutual positions of the free end portion 18 of the tongue 12 and the edge portion 20 of the pressure means 11 to clearly read or determine if the tongue 12 is situated in an unstretched position OL (FIG. 3), in a stretched position SL (FIG. 4) or in any position therebetween. A stretched position SL is indicated in that the free end portion 18 of the tongue 12 is set in such an indicating position A relative to the edge portion 20 of the pressure means 11 that said free end portion 18 is located right opposite to and points at said edge portion 20. Thus, the free end portion 18 of the tongue 12 can be considered as acting as a movable pointer of the indicating device 21, and the edge portion 20 of the pressure means 11 as a fixed member of the indicating device 21.

As is apparent from the graph of FIG. 5, the tongue 12 is arranged so that it can not be overstressed or -stretched (e.g. in accordance with the dashed or broken line in the diagram) to exert such spring forces (e.g. of nearly 30 kp) that the high-frequency cables 2, 3 are damaged and their function thereby impaired. From the graph of FIG. 5 it is also apparent that the tongue 12 has such properties that it, when tightened to its stretched position SL, can maintain its pressure or tensional force of e.g. about 15 kp on the high-frequency cables 2, 3 irrespective of whether they, when cooled, decrease in radial range relative to the clamp 1 or, when heated, increase in radial range relative to said clamp 1. Hereby, it is ensured that the pressure of the tongue 12, when said tongue 12 is in its stretched position SL, can not be so small, e.g. only 8 kp, that the clamp 1 releases or looses its grip of the high-frequency cables 2, 3 when said cables decrease in radial range relative to the clamp 1, e.g. during cold weather. Additionally, it is ensured that the pressure of the tongue 12 against the high-frequency cables 2, 3 does not become unacceptably high, e.g. 30 kp, when said cables increase in radial range relative to the clamp 1 e.g. during warm weather.

The invention is not limited to the embodiment described above and illustrated in the drawings, but may vary within the scope of the following claims. As examples of alternative embodiments it can be mentioned that the clamp 1 may have another shape than shown, that the clamp 1 may be used for clamping or bracing only one high-frequency cable or another suitable number thereof, that the clamp may be attached to a holding device 4 in the form of a wall bracket instead of a part of a mast, that the pressure means 11 may be a pressure plate having a curved shape or another suitable shape, that the pressure means 11 and the tongue 12 may be made integral and of resilient material, that the spring means 12 may have another shape than a tongue and that the indicating device 21 may have another shape than shown and/or be arranged in another way than illustrated.

I claim:

1. A clamp for clamping or bracing high-frequency cables on a holding device, said clamp comprising a spring device for clamping at least one high-frequency cable to said holding device;

said spring device including a pressure means and a spring means;

said pressure means being adapted to engage high-frequency cable;

said spring means being adapted to be stretched so that in a stretched position said pressure means clamps at least one of the high-frequency cable to said holding device with a pre-determined spring force; and an indicating device providing an indication of whether said spring means has been stretched to the stretched position whereby said spring means clamps at least one high-frequency cable to said holding device with said pre-determined spring force;

said indicating device comprising a portion of said spring means and a portion of said pressure means, said portions of said spring means and said pressure means being arranged so that their positions relative to each other indicate a stress or tension of said spring means;

said portion of said spring means consisting of a free end portion of a tongue which is connected with said pressure means;

said portion of said pressure means being located adjacent said tongue.

2. A clamp according to claim 1, wherein said tongue is punched from said pressure means and has an adhering end portion which is opposite said free end portion and is attached to said pressure means, and said portion of said pressure means that forms part of said indicating device consists of an edge portion of an opening defined by the punching of said tongue from said pressure means.

3. A clamp according to claim 2, wherein said tongue is able to be stretched so that said free end portion of said tongue engages said opening at said edge portion.

4. A clamp according to claim 1, wherein said tongue cannot be overstressed.

5. A clamp according to claim 2, wherein said tongue is able to be stretched so that said free end portion of said tongue is able to engage at least one of the high-frequency cable.

6. A clamp according to claim 1, wherein said tongue cooperates with a pivotally mounted tightening means for stretching thereof, and said tongue and said tightening means are connected to each other so that said tightening means can be pivoted relative to said tongue.

7. A clamp according to claim 2, wherein said pressure means and said tongue are made of spring steel.

8. A clamp according to claim 1, wherein said tongue is able to be stretched so that in the stretched position said tongue exerts only such a limited spring force on the high-frequency cable that the function of the high-frequency cable is not deteriorated with regard to its signal distribution.

* * * * *